United States Patent [19]

Torpey et al.

[11] Patent Number: 4,835,553

[45] Date of Patent: May 30, 1989

[54] THERMAL INK JET PRINTHEAD WITH INCREASED DROP GENERATION RATE

[75] Inventors: Peter A. Torpey, Penfield; Ivan Rezanka, Pittsford; Narayan V. Deshpande, Penfield; Donald J. Drake, Rochester, all of N.Y.

[73] Assignee: Xerox Corporation, Stamford, Conn.

[21] Appl. No.: 236,430

[22] Filed: Aug. 25, 1988

[51] Int. Cl.⁴ .......................... G01D 15/16; B41J 3/04

[52] U.S. Cl. .................................................. 346/140

[58] Field of Search ........................................ 346/140

[56] References Cited

U.S. PATENT DOCUMENTS

| | | | |
|---|---|---|---|
| Re. 32,572 | 1/1988 | Hawkins et al. | 156/626 |
| 4,394,670 | 7/1983 | Sugitani | 346/140 |
| 4,463,359 | 7/1984 | Ayata et al. | 346/1.1 |
| 4,532,530 | 7/1985 | Hawkins | 346/140 R |
| 4,638,337 | 1/1987 | Torpey et al. | 346/140 R |
| 4,774,530 | 9/1988 | Hawkins | 346/140 |

*Primary Examiner*—Joseph W. Hartary
*Attorney, Agent, or Firm*—Robert A. Chittum

[57] ABSTRACT

An improved ink jet printhead comprising upper and lower substrates that are mated and bonded together with a thick film insulative layer sandwiched therebetween. One surface of the upper substrate has etched therein one or more grooves and a recess which when mated with the lower substrate will serve as capillary filled ink channels and ink supply manifold, respectively. The grooves are open at one end and closed at the other. The open ends serve as nozzles. The manifold recess is adjacent the grooved closed ends. Each channel has a heating element located upstream of the nozzle. The heating elements are selectively addressable by input signals representing digitized data signals to produce ink vapor bubbles. The growth and collapse of the bubbles expel ink droplets from the nozzles and propel them to a recording medium. A recess patterned in the thick layer provides a flow path for the ink from the manifold to the channels by enabling the ink to flow around the closed ends of the channels and increase the flow area to the heating elements. Thus, the heating elements lie at the distal end of the recesses so that a vertical wall of elongated recess prevents air ingestion while it increases the ink channel flow area and increases refill time, resulting in an increase in bubble generation rate.

6 Claims, 6 Drawing Sheets

THERMAL INK JET PRINTHEAD WITH INCREASED DROP GENERATION RATE

BACKGROUND OF THE INVENTION

1. Field of the Invention

This invention relates to ink jet printing and more particularly to a thermal ink printhead having increased frequency response enabled by ink channel geometry providing faster refill times.

2. Description of the Prior Art

Thermal ink jet printing is a type of drop-on-demand ink jet printing which uses selectively applied thermal energy to expel ink droplets by producing momentary vapor bubbles in ink-filled channels of a printhead. A thermal energy generator, usually a resistor, is located in each of a plurality of channels near the nozzles at one end thereof. The other ends of the channels are in communication with a common manifold or reservoir which contains a source of ink.

U.S. Pat. No. 4,463,359 to Ayata et al, discloses one or more ink filled channels which are replenished by capillary action. A meniscus is formed at each nozzle to prevent ink from weeping therefrom. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth and collapse of the bubbles. Current pulses are shaped to prevent the meniscus from breaking up and receding too far into the channels, after each droplet is expelled. Various embodiments of linear arrays of thermal ink jet device are shown, such as those having staggered linear arrays attached to the top and bottom of a heat sinking substrate and those having different colored inks for multiple colored printing.

U.S. Reissue Pat. RE No. 32,572 to Hawkins et al, discloses several fabricating processes for ink jet printheads, each printhead being composed of two parts aligned and bonded together. Many printheads can be simultaneosly made by producing a plurality of sets of heating element arrays with their addressing electrodes on, for example, a silicon wafer and by placing alignment marks thereon at predetermined locations. A corresponding plurality of sets of channels and associated manifolds are produced in a second silicon wafer and in one embodiment alignment openings are etched thereon at predetermined locations. The two wafers are aligned via the alignment openings and alignment marks and then bonded together and diced into many separate printheads.

U.S. Pat. No. 4,638,337 to Torpey et al discloses an improved thermal ink jet printhead similar to that of Hawkins et al, but has each of its heating elements located in a recess. Recess walls containing the heating elements located in a recesss. Recess walls containing the heating elements prevent the lateral movement of the bubbles through the nozzle and therefore the sudden release of vaporized ink to the atmosphere, known as blow-out, which causes ingestion of air and interrupts the printhead operation whenever this event occurs. In this patent, a thick film organic structure, such as Riston®, is interposed between the heater plate and the channel plate. The purpose of this layer is to have recesses formed therein directly above each heating element to contain the bubbles generated by the heating element, enabling an increase in droplet velocity without the occurrence of vapor blow-out.

Pending U.S. patent application Ser. No. 115,271, to Hawkins, entitled "Ink Jet Printhead", filed Nov. 2, 1987, now U.S. Pat. No. 4,774,530, discloses an improved printhead which comprises an upper and lower substrate that are mated and bonded together with a thick insulative layer sandwiched therebetween. One surface of the upper substrate has etched therein one or more grooves and a recess, which when mated with the lower substrate, will serve as capillary filled ink channels and ink supplying manifold, respectively. Recesses are patterned in the thick layer to expose the heating elements to the ink, thus placing them in a pit and to provide a flow path for the ink from the manifold to the channels by enabling the ink to flow around the closed ends of the channels, thereby eliminating the fabrication steps required to open the groove closed ends to the manifold recess so that the printhead fabrication process is simplified.

The above disclosed thermal ink jet printheads have a relatively long channel through which ink is supplied from the reservoir to the nozzle. The heatig elements which produce the bubbles are placed in pits in the channel a predetermined distance upstream from the nozzle openings. The pits prevent bubble blow-out, thus avoiding printhead failure. Unfortunately, the maximum frequency of such printheads is around 3 KHz. The operating frequency is governed by the channel refill time, and the channel offers the maximum resistance to flow. The present invention increases the droplet generation rate or operating frequency by minimizing the channel resistance to flow.

SUMMARY OF THE INVENTION

It is an object of the present invention to provide an improved ink jet printhead having faster channel refill times without losing its ability to prevent bubble blowout with constant ingestion of air.

In the present invention, a thick film organic structure, such as Vacrel® or Riston® is sandwiched between the heater plate and the channel plate. This layer is between 5 to 100 microns thick, but the preferable thickness range is 10 to 50 microns. After the plurality of sets of heating elements, addressing electrodes, and driving a circuitry have been formed on the wafer, a thick film, organic layer is deposited thereover. Individual recesses are formed in the thick film organic structure for each set of heating elements and associated circuitry to expose each of the heating elements and provide a continuous recess extending into the printhead reservoir. This arrangement places each heating element at the bottom of one end of a an elongated recess and prevents the occurrence of vapor blow-out. The other end of the recesses will terminate at a predetermined location, so that when a channel plate is aligned and bonded to the thick film structure overlaying the heater plate, the ink may flow from the reservoir to the ink channels. In a second embodiment, the elongated grooves in the thick film structure opens into a common recess formed in a predetermined location so that when the channel plate is aligned and bonded to the thick film structure overlaying the heater plate, the ink may flow from the printhead reservoir through the common recess in the thick film structure and along the elongated recesses which form part of the ink channel to provide an ink channel geometry which permits rapid refill and consequently increased droplet generation frequency. In a third embodiment, an additional film of polyimide or epoxy is interposed between the passivated circuitry on the heater plate and the thick film structure to provide improved circuitry protection from the ink.

A more complete understanding of the present invention can be obtained by considering the following detailed description in conjunction with the accompanying drawings wherein like index numerals indicate like parts.

DESCRIPTION OF THE PREFERRED EMBODIMENT

Figure 1:
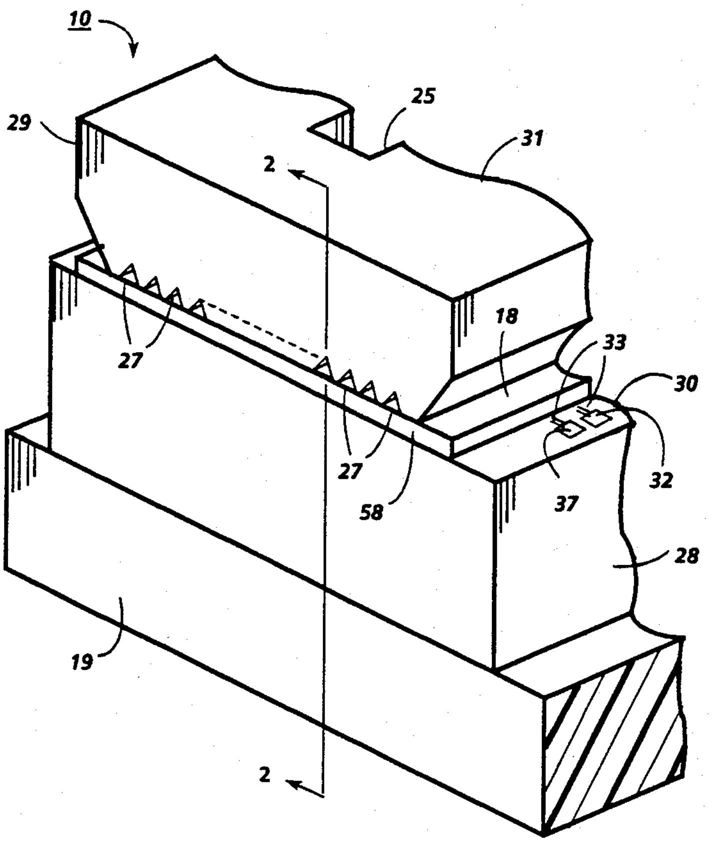
FIG. 1 is an enlarged schematic isometric view of a printhead mounted on a daughter board showing the droplet emitting nozzles.
Figure 2:
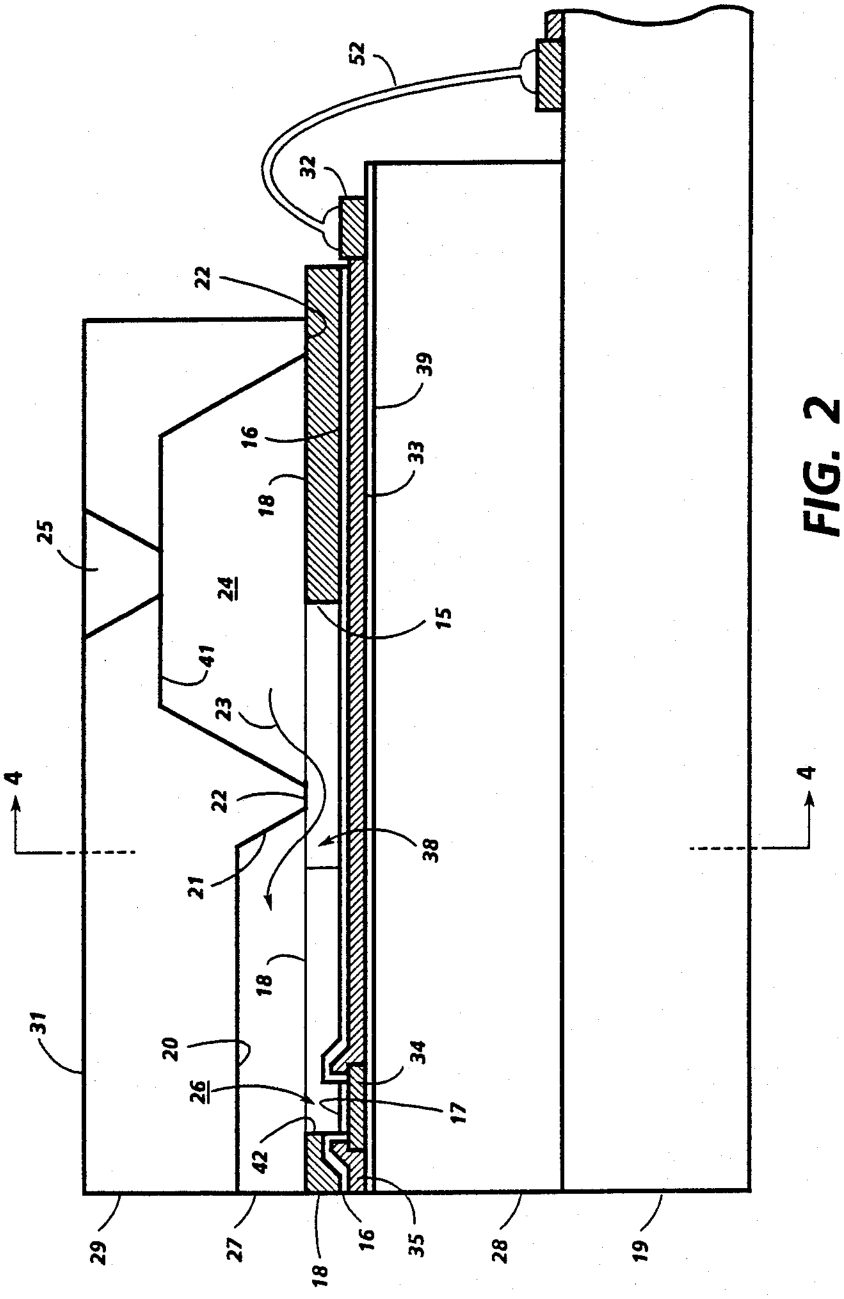
FIG. 2 is an enlarged cross sectional view of FIG. 1 as viewed along the view line 2-2 thereof and showing the electrode passivation and recessed thick film structure which provides the ink flow path between the manifold and ink channels in accordance with the present invention.

An enlarged schematic isometric view of the printhead 10, showing the array of droplet emitting nozzles 27 in front face 29 of channel plate 31, is depicted in FIG. 1. Referring also to FIG. 2, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the channel plate front face 29. The other end of grooves terminate at slanted wall 21. The floor 41 of the internal recess 24, which is used as the ink supply manifold or reservoir for the capillary filled ink channels 20, has an opening 25 therethrough for use an ink fill hole. The surface of the channel plate with the grooves are aligned and bonded to the heating element plate 28 so that a respective one of the plurality of heating elements 34 is positioned in each channel formed by the grooves and the lower substrate or heater plate. Ink enters the manifold or reservoir formed by the recess 24 and the heating element plate 28 through the fill hole 25 and, by capillary action, fills the channels 20 by flowing through, in one embodiment, a common recess 38 formed in the thick film insulative layer 18. The ink at each nozzle forms a meniscus at a slight negative pressure, which prevents the ink from weeping therefrom. The addressing electrodes 33 on the channel plate 28 terminate at terminals 32. The channel plate 31 is smaller than that of the lower substrate 28 in order that the electrode terminals 32 are exposed and available for connection to the electrodes on the daughter board 19 by, for example, wire bonds 52 on which the printhead 10 is permanently mounted. Layer 18 is a thick film passivation layer, discussed later, sandwiched between upper and lower substrates. This layer is patterned to form a common recess 38 together with a plurality of elongated parallel recesses or troughs 26 extending from and in communication at one end with the common recess. The distal ends of the etched troughs have the heating elements, thus placing them at the bottom of the trough distal end. The common recess 38 enables ink flow between the manifold 24 and the channels 20. In addition, the thick film insulative layer is etched to expose the electrode terminals, better seen in FIGS. 3 and 5.

A cross sectional view of FIG. 1 is taken along view line 2-2 through one channel and shown as FIG. 2 to show how the ink flows from the manifold 24 and around the closed end 21 of groove 20 as depicted by arrow 23. A plurality of sets of bubble generating heating elements 34 and their addressing electrodes 33 are patterned on the polished surface of a single side polished (100) silicon wafer. Prior to patterning, the multiple sets of printhead electrodes 33, the resistive material that serves as the heating elements, and the common return 35, the polished surface of the wafer is coated with an underglaze layer 39, such as, silicon dioxide, having a thickness of about 1–2 micrometers. The resistive material may be doped polycrystalline silicon which may be deposited by chemical vapor deposition (CVD) or any other well known resistive material such as zirconium boride ($ZrB_2$). The common return 35 and the addressing electrodes 33 are typically aluminum leads deposited on the underglaze and over the edges of the heating elements. The common return terminals 37 and addressing electrode terminals 32 are positioned at predetermined locations to allow clearance for electrical connection to the electrodes 50 of the daughter board 19 by wire bonds 52, after the channel plate 31 is attached to the heating element plate to make a printhead. The common return 35 and the addressing electrodes 33 are deposited to a thickness of 0.5 to 3 micrometers, with the preferred thickness being 1.5 micrometers. For further details, refer to the patents and pending application discussed in the prior art section.

In the preferred embodiment, polysilicon heating elements are used and a silicon dioxide thermal oxide layer 17 is grown from the polysilicon in high temperature steam. For more details about the production of polysilicon heating elements, refer to U.S. Pat. No. 4,552,530 to Hawkins. The thermal oxide layer is typically grown to a thickness of 0.5 to 0.1 micrometer to protect and insulate the heating elements from the conductive ink. The thermal oxide is removed at the edges of the polysilicon heating elements for attachment of the addressing electrodes and common return, which are then patterned and deposited. Before electrode passivation, a tantalum (Ta) layer (not shown) may be optionally deposited to a thickness of about 1 micrometer on the heating element protective layer 17 for added protection thereof against the cavitational forces generated by the collapsing ink vapor bubbles during printhead operation. For electrode passivation, a two micrometer thick phosphorus doped CVD silicon dioxide film 16 is deposited over the entire wafer surface, including the plurality of sets of heating elements and addressing electrodes. The passivation film 16 provides an ion barrier which will protect the exposed electrodes from the ink. An effective ion barrier layer is achieved when its thickness is between 1000 angstrom and 10 micrometers, with the preferred thickness being 1 micrometer. The passivation layer 16 is etched off of the heating element or Ta layers and terminal ends of the common return and addressing electrodes for wire bonding later with the daughter board electrodes. This etching of the silicon dioxide film 16 may be by either the wet or dry etching method.

Next, a thick film type isulative layer 18 such as, for example, Riston®, Vacrel®, Probimer 52®, or polyimide, is formed on the passivation layer 16 having a thickness of between 5 and 100 micrometers and preferably in the range of 10 to 50 micrometers. The insulative layer 18 is photolithographically processed to enable etching and removal of those portions of the layer 18 which cover each heating elements, the common recess 38 providing ink passage from the ink manifold 24 to each of the ink channels 20, and elongated recesses 26 extending from the heating elements and into communication with the common recess 38. In addition, the thick film layer 18 is removed over each electrode terminal 32, 37. The plurality of the combined elongated recesses 26 and common recess 38 for each set of heating elements on the wafer, which is to be subsequently divided into individual heating element plates 28, is formed by the removal of these portions of the thick film layer 18. Thus, the passivation layer 16 alone protects the electrodes 33 from exposure to the ink in this recess composed of a common recess 38 with a plurality of parallel elongated recesses 26 extending therefrom.

Figure 3:
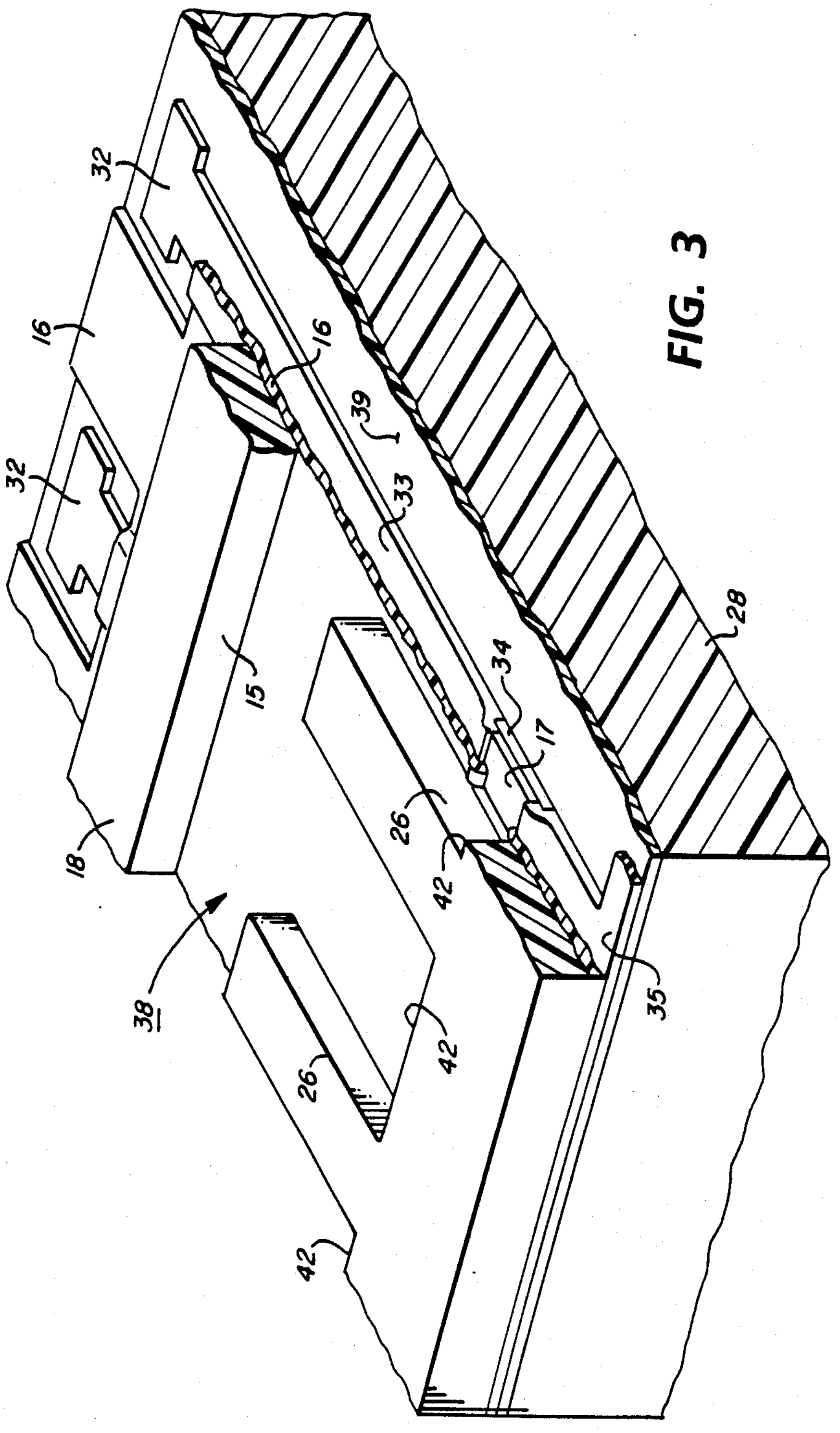
FIG. 3 is an enlarged partially shown isometric view of the heating elements plate as viewed prior to mating with the channel plate to form the printhead. The heating element plate is partially sectioned to show the elongated recesses extending from a common recess. The heating elements are exposed at the distal end of the elongated recesses and the common recess communicating with the the elongated recesses permit the flow of ink from the manifold into the ink channels.

In FIG. 3, an enlarged, partially sectioned isometric view of the heating element plate 28 is shown. Part of the electrode passivation layer 16 and the overlaying relatively thick insulating layer 18 (preferably Riston®, Vacrel®, polyimide, or equivalent) is removed from a portion of one addressing electrode for ease of understanding the improved heating element plate construction. Each layer 18 is photolithographically patterned and etched to remove it from the electrode terminals 32, 37, an area 26 beginning at each heating element 34 and its protective layer 17 and extending to a common recess 38. The common recess 38 is located at a predetermined position to permit ink flow from the manifold to the channels, after the channel plate 31 is mated thereto. The distal end of the elongated recesses 26 exposed each heating element and the rest of the elongated recesses enlarge the ink flow areas in each ink channel. The common recess 38, which is in communication with the plurality of elongated recesses 26, opens the ink channels to the manifold 24 (see FIG. 2). The distal end wall 42 of the elongated recess 26 inhibits lateral movement of each bubble generated by the pulsed heating element and thus promotes bubble growth in a direction normal thereto, while the rest of the elongated recess increases the ink flow area and enables faster refill time during the printhead operation. The blowout phenomena of releasing a burst of vaporized ink with the consequent ingestion of air is avoided as disclosed in U.S. Pat. No. 4,638,337, but without the restriction on the frequency of droplet expulsion.

The passivated addressing electrodes 33 are exposed to ink along the majority of their length because of the elongated recesses 26, and any pin hole in the normal electrode passivation layer 16 exposes the electrode 33 to electrolysis which would eventually lead to operational failure of the heating element addressed thereby. Accordingly, the alternate embodiment shown in FIG. 6, a view similar to that of FIG. 2, shows an added protection of the addressing electrodes by a second passivating layer 14. The electrodes are therefore passivated by two overlapping layers, passivation layer 16 and second layer 14 of polyimide or similar material.

Figure 5:
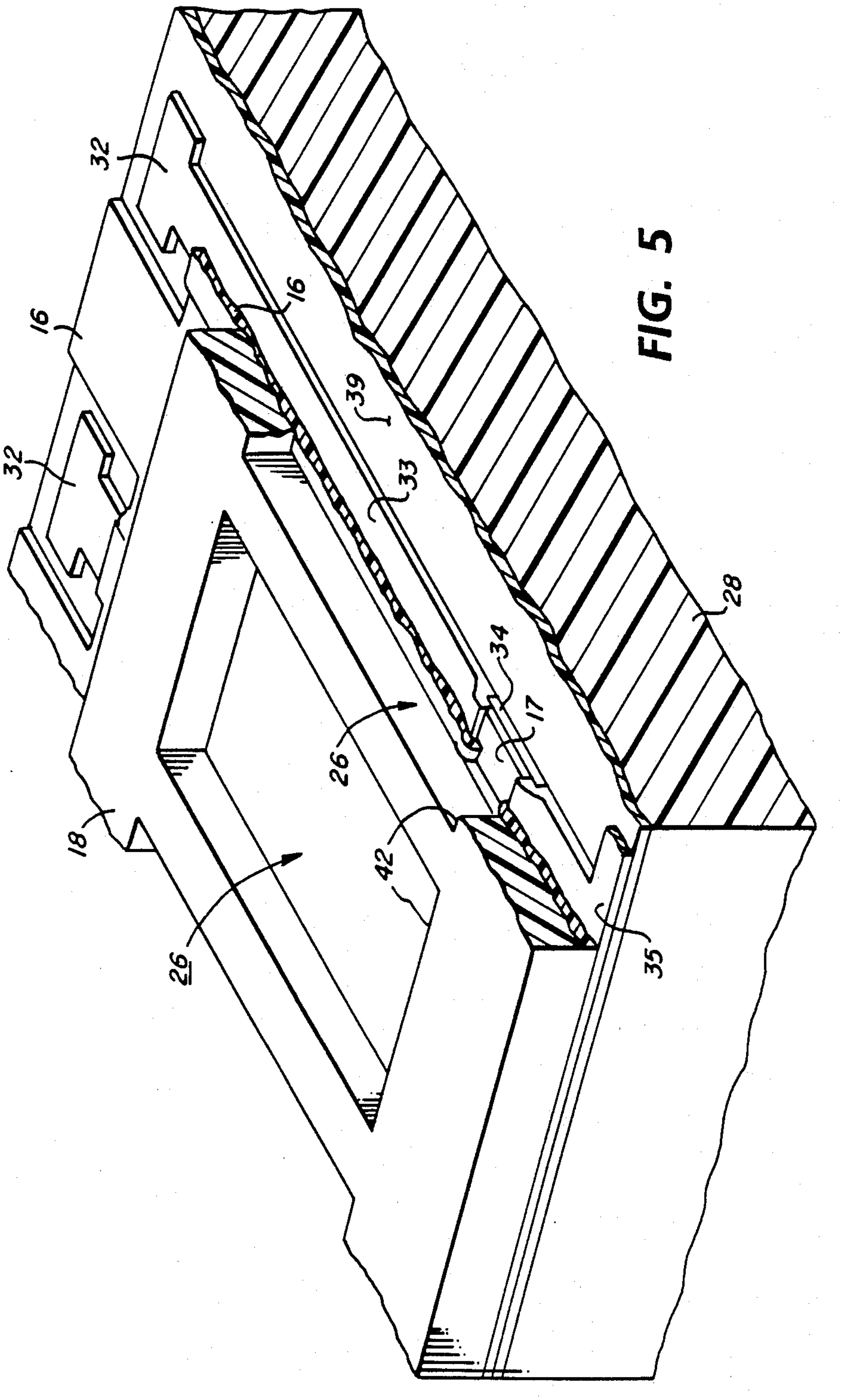
FIG. 5 is an enlarged partially shown isometric view of another embodiment of the present invention showing the heating element plate partially sectioned to show the recessed heating element at one end of a plurality of individual elongated recesses that permit the flow of ink from the manifold into each of the ink channels.

FIG. 5 is a similar view to that of FIG. 3 without the common recess 38 and with instead a set of elongated recesses 26 extending into the channel plate reservoir 24 to permit the ink to flow from the reservoir to the ink channels 20.

As disclosed in U.S. Reissue Pat. No. RE 32,572; U.S. Pat. No. 4,638,337; and pending application Ser. No. 115,271, filed Nov. 2, 1987 to Hawkins, the channel plate 32 is formed from a two-side-polished, (100) silicon wafer to produce a plurality of upper substrates or channel plates 31 for the printhead 10. After the wafer is chemically cleaned, a pyrolytic CVD silicon nitrite layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitride is plasma etched off of the patterned vias representing the fill holes and alignment openings. A potassium hydroxide (KOH) anistropic etch may be used to etch the fill holes and alignment openings. In this case, the {111} planes of the (100) wafer make an angle of 54.7 degrees with the surface of the wfaer. The fill holes are small square surface patterns of about 20 mils (0.5 mm) per side and the alignment openings are about 60 to 80 mils (1.5 to 2 mm) square. Thus, the alignment openings are etched entirely through the 20 mil (0.5 mm) thick wafer, while the fill holes are etched to a terminating apex at about halfway through to three-quarters through the wafer. The relatively small square fill hole is invariant to further size increase with continued etching so that the etching of the alignment openings and fill holes are not significantly time constrained. Next, the opposite side of the wafer is photolithographically patterned, using the previously etched alignment holes as a reference to form the relatively large rectangular recesses 24 and sets of elongated, parallel channel recesses that will eventually become the ink manifolds and channels of the printheads. The surface 22 of the wafer containing the manifold and channel recesses are portions of the original wafer surface (covered by a silicon nitride layer) on which adhesive will be applied later for bonding it to the substrate containing the plurality of sets of heating elements. A final dicing cut, which produces end face 29, opens one end of the elongated groove 20 producing nozzles 27. The other ends of the channel groove 20 remain closed by end 21. However, the alignment and bonding of the channel plate to the heater plate places the ends 21 of channels 20 directly over common recess 38 in the thick film insulative layer 18 as shown in FIG. 2 or directly above the ends of the elongated recesses 26, which are opposite the one containing the heating elements, as shown in FIG. 5, enabling the flow of ink into the channels from the manifold as depicted by arrows 23.

Figure 4A:
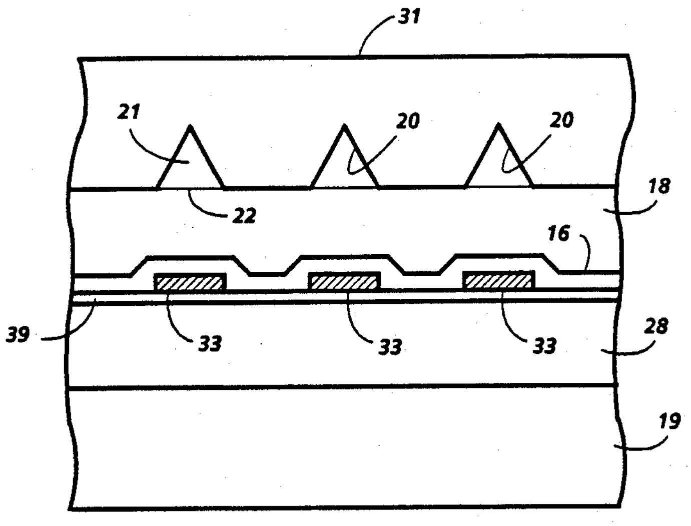
FIG. 4A is an enlarged cross sectional view of FIG. 2 as viewed along the line 4—4 thereof and showing the embodiment of the present invention depicted in FIG. 3.

FIG. 4A is a partial cross sectional view of the printhead shown in FIG. 2 as viewed along view line 4—4, which shows that the common recess 38 in the thick film layer 18 extends the full width of all of the channels 20 and in a direction perpendicular thereto.

Figure 4B:
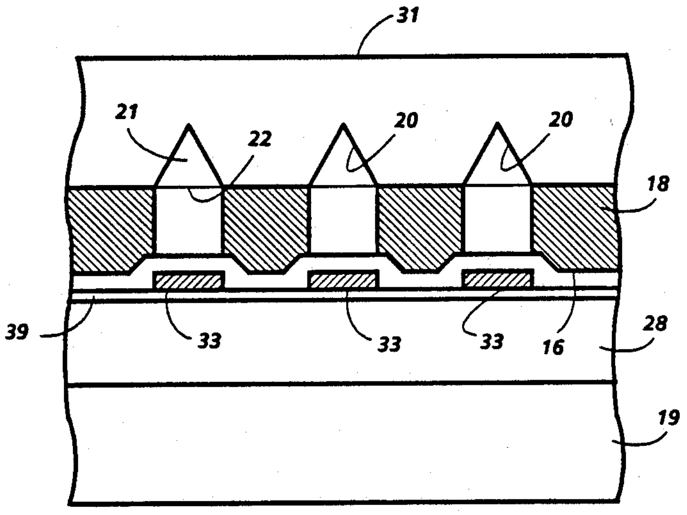
FIG. 4B is an enlarged cross sectional view of FIG. 2 as viewed along the line 4—4 thereof and showing a second embodiment of the present invention depicted in FIG. 5.

FIG. 4B is a partial cross sectional view of the printhead shown in FIG. 2, as viewed along view line 4—4, which shows that the elongated recesses 26 of alternate embodiment in FIG. 5 each extend into the channel plate reservoir 24 and thus permit the ink to flow from the reservoir into the channels 20.

U.S. Pat. No. 4,638,337 shows an ink jet printhead having a relatively long channel through which ink is supplied from the reservoir to the nozzle. The heater which produces the bubble is placed in a pit in a thick film layer in the channel upstream from the nozzle opening. The pit prevents air ingestion, thus avoiding printhead failure. Analysis of such a printhead configuration indicates that it can be operated at a maximum frequency of about 5 KHz at 300 spots per inch (spi) printing. The operating frequency is governed by the channel refill time. It is known by those skilled in the art that the channel offers the maximum resistance to flow in the printhead. This invention delineates a geometry which minimizes the channel resistance, making it possible to operate the printhead at a frequency increased by at least 20-30%. The pit geometry of the prior art is eliminated and instead only a step is provided which prevents air ingestion. The passageway from the heater to the reservoir is enlarged by the elongated recess 26 to increase the cross sectional flow area and minimize the flow resistance.

In an alternate embodiment not shown, the end wall 21 could be removed as taught by the above-mentioned prior art patents, and the length of the elongated recesses 26 can be optimized so as to avoid crosstalk between neighboring jets. The inertance behind the heater is proportional to the distance from the heating element to the reservoir divided by the channel flow area, and must be high enough so that the bubble does not expand and/or push too much fluid backward in the channel. The resistance (proportional to the distance from the heating element to the reservoir divided by the channel flow area squared) is very important in determining the refill time. If this number is large, refill times will be long. The resistance of the channel segment behind the heater can be greatly reduced, without reducing the inertance, by increasing the cross sectional area of this segment and the distance of the heating element to the reservoir. As shown in FIGS. 2, 3, and 5, this may be done in a variety of ways. In the preferred embodiments of FIGS. 2 and 3, a common recess 38 at the closed ends of channel 20 enables ink to flow from the reservoir 24 to the ink channels 20 and elongated recesses 26 aligned with each channel. The heating elements are exposed at the distal ends of the elongated recesses 26 and these recesses increase the ink channel flow area, so that the droplet expulsion rate may be increased while retaining the benefit of air ingestion prevention.

Figure 6:
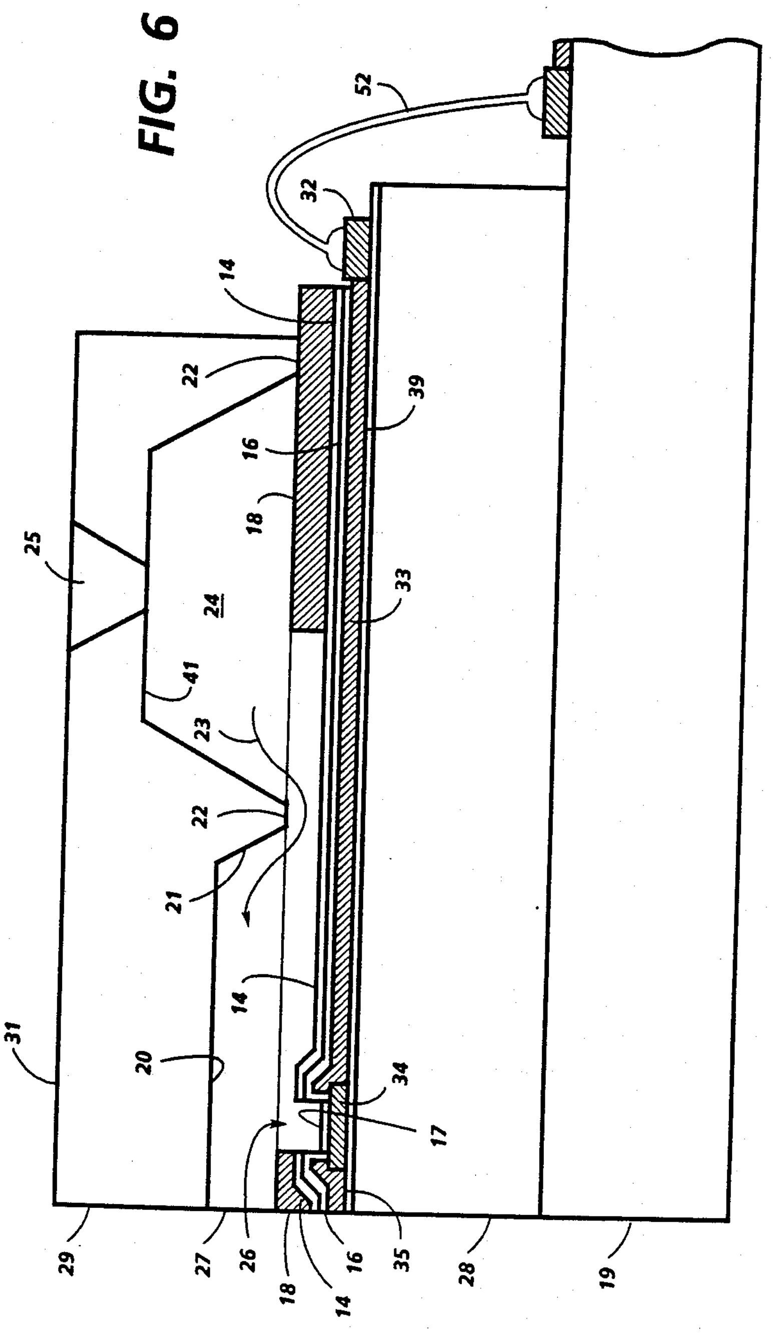
FIG. 6 is an enlarged cross sectional view similar to FIG. 2 but showing an additional protective layer betwen the thick film structure and the passivated circuitry.

The thick film insulative layer 18 serves two separate functions: (1) as part of the fluid flow path, active in bubble formation, and refill phenomena, and (2) as an additional passivation layer to protect metallization leads and active drivers from ink and possibly ions therein. By removing much of the thick film insulative layer between the heaters an the channel plate reservoir, the added passivation layer protection is lost. To insure a pin hole free film of passivation, a second passivation layer of, for example, polyimide, is deposited prior to placement of the thick film insulative layer 18 thereon. Thus, the alternate embodiment depicted in FIG. 6 is a two layer passivation system on the heater place. The typical first layer is a thin passivation layer which has vias at the electrode terminals 32 and 37. Suitable materials available are photosensitive polyimides or photosensitive epoxys. These materials are spun on and processed using conventional integrated circuit processing equipment. The thin film thickness can be adjusted by tailoring viscosity or spin speed. In thin layers, these materials have reasonable exposure times and good resolution. A second layer of photosensitive polyimide provides substantially the same protection as the thick film insulative material provided by the prior art structures.

In recapitulation, this invention relates to an improved thermal ink jet printhead and method of fabrication thereof. A thick film of solder mask material or other organic structure such as Riston®, Vacrel®, Probimer 52®, or polyimide, or the like is interposed between the heater plate and the channel plate. In the prior art, this layer enables the formation of pits over the heating elements which will contain the temporary bubbles so that droplet velocity may be increased without vapor blowout and the consequent ingestion of air. By further adding a second elongated recess behind the heating element pits, as disclosed in pending application Ser. No. 115,271, filed Nov. 2, 1987 to Hawkins, the ink from the reservoir can communicate with the channel thereby eliminating the need to remove the silicon between the channel grooves and the manifold recess. The elongated recess or trough provided by bypass for the ink. However, these prior art configurations limited the droplet generation rate of the printheads. The present invention eliminates this operating frequency limitation by patterning the thick film insulative layer to connect the heater pits with the bypass recess to form elongated recesses aligned with the channel plates to increase the ink flow paths in the channel thereby increasing the refill times after the expulsion of each droplet. An alternative embodiment eliminates the common bypass recess and simply use elongated recesses or troughs in the thick film insulative layer which house the heating element at one end and extended the other end into the reservoir to enable ink flow from the reservoir to the ink channel without removal of the channel plugged end and still provide the increased flow area necessary for each channel to increase its refill time and maximize its operating frequency. The final embodiment uses a two layer passivation system to maintain the pin hole free integrity of the exposed metallization caused by the elongated recesses in the thick film insulative layer necessary to provide the geometrical configuration that allows increase cross sectional flow areas and therefore increase refill times.

Many modifications and variations are apparent from the foregoing description of the invention, and all such modifications and variations are intended to be within the scope of the present invention.

We claim:

1. An improved ink jet printhead of the type having an upper substrate with a set of parallel grooves for subsequent use as ink channels and a recess for subsequent use as a manifold, the grooves being open at one end for serving as droplet emitting nozzles, the further having a lower substrate in which one surface thereof has an array of heating elements and addressing electrodes formed thereon, the upper and lower substrates being aligned, mated, and bonded together to form the printhead with a thick film layer sandwiched therebetween, the thick film layer having been deposited on the surface of the lower substrate and over the heating elements and addressing electrodes and a portion removed therefrom to expose the heating elements and terminal ends of the addressing electrodes prior to said mating and bonding of the substrates, wherein the improvement comprises:

said thick film layer being patterned to remove that portion along the length of each confronting parallel groove in the upper substrate, beginning at each of the heating elements and extending a predetermined distance in a direction toward said manifold recess, the length of removed thick film layer exposing the heating elements at one end and the other end terminating within the confronting manifold recess, so that ink in the manifold recess flows therefrom along said removed portions of thick film layer and concurrently into the grooves forming the ink channels, the removed portions of the thick film layer having walls which extend the depth of the ink channels along the length thereof, provide means to inhibit air ingestion by preventing blow-out of vaporized ink through the nozzle during operation of the printhead, and by extending into the manifold, providing communication between the ink channels and the manifold, the combined cross sectional flow area of the ink channels and removed portion of thick film layer aligned therewith having sufficient size to enable reduced ink flow resistance, so that the ink droplet generation rate is increased without air ingestion.

2. The improved printhead of claim 1, further comprising a second passivation layer deposited prior to the placement of the thick film layer to insure pin hole free protection layer between the ink and the electrodes within the removed portions of the thick film layer.

3. The improved printhead of claim 1, wherein the removed portions of the thick film layer are a plurality of individual elongated trenches, one for each ink channel.

4. The improved printhead of claim 3, wherein the printhead further comprises a second passivation layer deposited prior to the placement of the thick film layer.

5. The improved printhead of claim 1, wherein the removed portions of the thick film layer comprise a common recess substantially perpendicular to the ink channels with a plurality of parallel extensions, one extension for each ink channel and aligned therewith, the common recess being located between the ink channels and the manifold to provide communication therebetween.

6. The improved printhead of claim 5, wherein the printhead further comprises a second passivation layer deposited prior to the placement of the thick film layer.

* * * * *